(12) United States Patent
Miyatake et al.

(10) Patent No.: US 6,864,932 B2
(45) Date of Patent: Mar. 8, 2005

(54) OPTICAL MEMBER AND LIQUID-CRYSTAL DISPLAY DEVICE

(75) Inventors: Minoru Miyatake, Osaka (JP); Shuuji Yano, Osaka (JP); Yuuichi Nishikouji, Osaka (JP)

(73) Assignee: Nitto Denko Corporation, Ibaraki (JP)

( * ) Notice: Subject to any disclaimer, the term of this patent is extended or adjusted under 35 U.S.C. 154(b) by 39 days.

(21) Appl. No.: 10/122,409

(22) Filed: Apr. 16, 2002

(65) Prior Publication Data

US 2002/0159006 A1 Oct. 31, 2002

Related U.S. Application Data

(63) Continuation-in-part of application No. 10/067,293, filed on Feb. 7, 2002, now abandoned.

(30) Foreign Application Priority Data

Apr. 16, 2001 (JP) .................................... P2001-116431

(51) Int. Cl.[7] ............................................ G02F 1/1335
(52) U.S. Cl. ......................... 349/98; 349/96; 349/117; 349/122; 359/483
(58) Field of Search ..................... 349/96–98, 117–121, 349/122; 359/483

(56) References Cited

U.S. PATENT DOCUMENTS

| | | | | |
|---|---|---|---|---|
| 5,249,071 A | * | 9/1993 | Yoshimizu et al. ......... | 349/102 |
| 5,380,459 A | * | 1/1995 | Kanemoto et al. ...... | 252/299.01 |
| 5,999,243 A | * | 12/1999 | Kameyama et al. ......... | 349/185 |
| 6,236,439 B1 | * | 5/2001 | Saiki et al. .................. | 349/117 |
| 6,327,010 B1 | * | 12/2001 | Scheuble et al. ........... | 349/118 |
| 6,559,834 B1 | * | 5/2003 | Murakami et al. .......... | 345/173 |
| 6,573,961 B2 | * | 6/2003 | Jiang et al. ................. | 349/115 |
| 6,583,834 B1 | * | 6/2003 | Uchiyama ................... | 349/122 |

OTHER PUBLICATIONS

Y. Iwamoto et al.; SID 2000 DIGEST, pp. 902–905. Discussed in the specification.

"Improvement of Transmitted Light Efficiency in SH–LCDs Using Quarter–Wave Retardation Films" by Y. Iwamoto, Y. Toko, H. Hiramoto and Y. Iimura; SID 00 DIGEST, pp. 902–905.

* cited by examiner

Primary Examiner—Tarifur R. Chowdhury
Assistant Examiner—Michael H Caley
(74) Attorney, Agent, or Firm—Westerman, Hattori, Daniels & Adrian, LLP

(57) ABSTRACT

An optical member has a polarizer, a viewing angle compensating plate, and an adhesive layer which has a refractive index $N_D^{20}$ not lower than 1.485 and through which the polarizer and the viewing angle compensating plate are laminated on each other. A liquid-crystal display device has at least one optical member defined above, a liquid-crystal cell, and an adhesive layer which has a refractive index $N_D^{20}$ not lower than 1.485 and through which the optical member is bonded onto at least one of opposite surfaces of the liquid-crystal cell.

9 Claims, 1 Drawing Sheet

OPTICAL MEMBER AND LIQUID-CRYSTAL DISPLAY DEVICE

This is a continuation-in-part of Ser. No. 10/067,293, filed Feb. 7, 2002, now abandoned.

The present application is based on Japanese Patent Application No. 2001-116431, which is incorporated herein by reference.

BACKGROUND OF THE INVENTION

1. Field of the Invention

The present invention relates to an optical member capable of being used for forming a liquid-crystal display device excellent in visibility such as contrast or brightness at a wide viewing angle.

2. Description of the Related Art

High contrast of 10 or higher in a viewing angle range of 80 degrees in vertical and horizontal directions has been heretofore required of a large-screen TV, or the like, using liquid-crystal display. In consideration of this requirement, a method using a circularly polarizer to solve a problem of reduction in luminance due to reduction in numerical aperture on the basis of split portions obtained by dividing each pixel into multiple domains compared with a mono-domain type has been proposed (Proceedings of SID2000 [31, 35.3(2000)902]) in a liquid-crystal panel of the type in which orientation of liquid crystal is divided into fine domains as in a multiple-domain VA (vertical alignment) mode to compensate for a retardation generated in each domain with another domain (pixel) to thereby achieve good visibility at a wide viewing angle. There was however a problem that contrast was lowered because light leakage occurred when black was displayed. Similar problems may occur when using linearly polarizer.

SUMMARY OF THE INVENTION

An object of the invention is to develop an optical member which prevents reduction in contrast in a pixel division display method by use of a polarizer to thereby make it possible to form a liquid-crystal display device excellent in visibility such as contrast or brightness at a wide viewing angle. Another object of the invention is to develop an optical member which prevents reduction in contrast in a pixel division display method on the basis of a circularly polarizing mode by use of a circularly polarizer to thereby make it possible to form a liquid-crystal display device excellent in visibility such as contrast or brightness at a wide viewing angle.

According to the invention, there is provided an optical member including: a polarizer, for example, a linearly or circularly polarizer; a viewing angle compensating plate; and an adhesive layer which has a refractive index $N_D^{20}$ not lower than 1.485 and through which the polarizer and the viewing angle compensating plate are laminated on each other. According to the invention, there is provided a liquid-crystal display device including at least one optical member defined above, a liquid-crystal cell, and an adhesive layer which has a refractive index $N_D^{20}$ not lower than 1.485 and through which the optical member is bonded onto at least one of opposite surfaces of the liquid-crystal cell.

According to the invention, there can be obtained an optical member in which reduction in contrast is prevented to thereby make it possible to form a liquid-crystal display device excellent in visibility such as contrast or brightness at a wide viewing angle. For example, in application of a circularly polarizer to a pixel division display method due to a circularly polarizing mode, interfacial reflection in the optical member is suppressed. In particular, the inventors have made eager researches to overcome the problem of reduction in contrast in the pixel division display method due to a circularly polarizing mode. As a result, the following fact has been found. With respect to such reduction in contrast, when circularly polarized light is interfacially reflected, the phase shifts by 180 degrees so that the direction of rotation is inverted laterally. For this reason, a part of circularly polarized light interfacially reflected in the liquid-crystal display panel is converted into unexpected circularly polarized light. As a result, the unexpected circularly polarized light serves as leaked light at the time of the display of black, so that contrast is reduced. Similar improvement effects can also be obtained in the case of other polalizers, such as linearly polarizers.

Therefore, an optical member in which inversion of circularly polarized light due to interfacial reflection can be suppressed is provided to overcome reduction of contrast in the pixel division display method due to a circularly polarizing mode based on multi-domain orientation to thereby achieve good-contrast display at a wide viewing angle. In addition, in liquid-crystal display at a wide viewing angle, an image can be viewed from a shallow angle with respect to a display screen having a large obliquely viewing angle and interfacial reflection is made more conspicuous. Hence, suppression of interfacial reflection makes a large contribution to improvement of visibility. Similar effect can be obtained in the case of using other polarizers, such as linearly polarizers.

Features and advantages of the invention will be evident from the following detailed description of the preferred embodiments described in conjunction with the attached drawings.

DETAILED DESCRIPTION OF THE PREFERRED EMBODIMENTS

Figure 1:
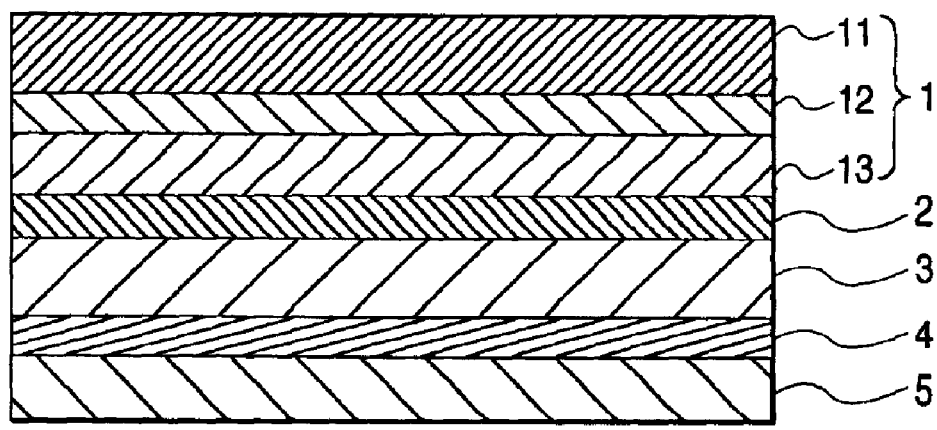
FIG. 1 is a sectional view showing an embodiment of the invention.

An optical member according to the invention includes: a polarizer, for example, a linearly or circularly polarizer; a viewing angle compensating plate; and an adhesive layer which has a refractive index $N_D^{20}$ not lower than 1.485 and through which the polarizer and the viewing angle compensating plate are laminated on each other. FIG. 1 shows an example of the optical member in the case of a circularly polarizer. In FIG. 1, the reference numeral 1 designates a circularly polarizer; 2, an adhesive layer having a refractive index $N_D^{20}$ not lower than 1.485; and 3, a viewing angle compensating plate. Incidentally, the circularly polarizer 1 shown in FIG. 1 is made of a laminate of a linearly polarizer 11 and a quarter-wave plate 13 through an adhesive layer 12 having a refractive index $N_D^{20}$ not lower than 1.485. In FIG. 1, the reference numeral 4 also designates an adhesive layer having a refractive index $N_D^{20}$ not lower than 1.485. The adhesive layer 4 is provided for bonding the member to another member and is generally temporarily covered with a separator 5 as shown in FIG. 1 so that the adhesive layer 4 can be protected until the adhesive layer 4 is put into practical use.

A suitable material can be used as the circularly polarizer and there is no particular limitation on the kind thereof. Examples of the circularly polarizer include a circularly polarizer made of a laminate of a linearly polarizer and a quarter-wave plate as shown in FIG. 1, and a circularly polarizer made of a cholesteric liquid-crystal layer oriented in Grandjean texture.

As the linearly polarizer, there is no particular limitation on the kind thereof, for example, a reflective type polarizer which allows linearly polarized light to be transmitted such as a linearly polarized light separating sheet (such as those disclosed in U.S. Pat. No. 6,025,897 which is incorporated herein by reference, for example, DBEF made by 3M Company) which is typically constituted by a multilayer film made of a laminate of thin films for separating incident light into a reflected light component and a transmitted light component of linearly polarized light with vibration planes crossing each other perpendicularly through interfacial reflection in the multilayer film; and other suitable materials capable of transmitting linearly polarized light but absorbing the other light. Preferably, a polarizing film, or a polarizing film having one surface protected with a transparent protective layer or both surfaces protected with transparent protective layers may be used as the linearly polarizer. An example of the polarizing film is a drawn hydrophilic polymer film, such as a polyvinyl alcohol film, a partially formalized polyvinyl alcohol film or a partially saponified ethylene-vinyl acetate copolymer film, containing iodine and/or dichromatic dye adsorbed thereto.

The transparent protective layer provided on one or each of opposite surfaces of the polarizing film in accordance with necessity can be made of a suitable polymer. Especially, the transparent protective layer maybe preferably made of a polymer excellent in transparency, mechanical strength, heat stability, and moisture sealability. The transparent protective layer can be formed by a suitable method such as a method of application of a polymer solution, a method of bonding/laminating a film.

Specific examples of the polymer include: a cellulose polymer such as cellulose diacetate or cellulose triacetate; a polyester polymer such as polyethylene terephthalate or polyethylene naphthalate; an acrylic polymer such as a polycarbonate polymer or polymethyl methacrylate; a styrene polymer such as polystyrene or acrylonitrile-styrene copolymer; an olefin polymer such as polyethylene, polypropylene, polyolefin having a cyclo or norbornene structure or ethylene-propylene copolymer; and an amide polymer such as Nylon or aromatic polyamide.

Examples of the polymer further include: an imide polymer, a sulfone polymer; a polyether-sulfone polymer; a polyether-ether-ketone polymer; a polyphenylene sulfide polymer; a vinyl alcohol polymer; an allylate polymer; a polyoxymethylene polymer; an epoxy polymer; a vinyl butyral polymer; a blend of these polymers; and a polymer such as a polyester polymer, an acrylic polymer, an urethane polymer, an amide polymer, a silicone polymer or an epoxy polymer curable by heat or by irradiation with ultraviolet rays. Especially, a material excellent in isotropy such as a cellulose triacetate film with an average refractive index $N_D^{20}$ of 1.48 in terms of general grade may be preferably used as the polymer.

A suitable material can be used as the quarter-wave plate for converting linearly polarized light into circularly polarized light. Examples of the material include: a birefringent film constituted by a drawn film of any type polymer; an oriented film of a liquid-crystal polymer such as a discotic liquid-crystal polymer or a nematic liquid-crystal polymer; and a transparent substrate having such an oriented liquid-crystal layer supported thereon. The polymer for forming the birefringent film may be suitable one of the materials listed in the description of the transparent protective layer. The drawn film may be a film treated by a suitable method such as a uniaxial drawing method or a biaxial drawing method. The quarter-wave plate may be a birefringent film having a thickness wise refractive index which is controlled by a suitable method such as a method of giving shrinking force or/and expanding force under the presence of a heat-shrinkable film bonded to the birefringent film.

The quarter-wave plate may be a laminate of two or more retardation layers for the purpose of controlling optical characteristic such as retardation. Incidentally, there may be used a method of superposing a retardation layer functioning as a quarter-wave plate with respect to monochromatic light such as light with a wavelength of 550 nm and a retardation layer exhibiting another retardation characteristic, that is, for example, a retardation layer functioning as a half-wave plate on each other. In this case, the resulting plate can function as a quarter-wave plate in a wide wavelength range such as a visible light range.

A suitable material exhibiting characteristic of reflecting one of left-handed and right-handed circularly polarized light beams but transmitting the other light beam when natural light is made incident on the material can be used as the circularly polarizer constituted by a cholesteric liquid-crystal layer oriented in Grandjean texture, and there is no particular limitation on the kind thereof. The choleteric liquid-crystal layer may have a structure of arrangement in which two layers or three or more layers different in helical pitch of orientation in Grandjean texture, accordingly, different in wavelength of reflected light are used in combination so as to be superposed on each other or one another. A circularly polarizer capable of reflecting circularly polarized light in a wide wavelength range such as a visible light range can be obtained by such superposition. Hence, circularly polarized light transmitted in a wide wavelength range can be obtained.

The circularly polarizer constituted by a cholesteric liquid-crystal layer maybe obtained as a liquid-crystal polymer film. Generally, the circularly polarizer may be obtained as a transparent substrate having a liquid-crystal polymer layer which is formed on the transparent substrate so as to be oriented in Grandjean texture through an oriented film by rubbing. The superposed cholesteric liquid-crystal layer may be formed by a recoating method. Incidentally, any suitable one of the polymers listed in the description of the transparent protective layer can be used as the transparent substrate.

A suitable plate made of any one of the materials listed in the description of the quarter-wave plate and exhibiting a suitable retardation in accordance with a liquid-crystal cell as a subject of application can be used as the viewing angle compensating plate. The viewing angle compensating plate which can be preferably used from the point of view of the compensating effect is a plate having a frontal retardation of not larger than 100 nm on the basis of light with a wavelength of 550 nm and having a thicknesswise retardation of not smaller than 50 nm on the basis of light with a wavelength of 550 nm. Incidentally, the frontal retardation is defined as $(nx-ny) \cdot d$ and the thicknesswise retardation as $\{(nx+ny)/2-nz\} \cdot d$ in which nx and ny are in-plane refractive indices, nz is a thicknesswise refractive index, and d is a thickness of the viewing angle compensating plate.

The polarizer, for example, the linearly or circularly polarizer, and the viewing angle compensating plate are laminated on each other through an adhesive layer having a refractive index $N_D^{20}$ not lower than 1.485. Hence, interfacial reflection can be suppressed. Especially, in consideration of the fact that cellulose triacetate is often used as the transparent protective layer of the linearly polarizer, there may be preferably used an adhesive layer having a refractive index $N_D^{20}$ not lower than 1.485 but lower than those of the viewing angle compensating plate and the quarter-wave plate, particularly an adhesive layer having a refractive index which is the middle between those of materials to be laminated. Hereupon, "$N_D^{20}$" is a refractive index measured at the temperature of 20° C. with respect to the light having a wavelength of D-line of sodium line (589.3 nm).

Therefore, also when the linearly polarizer and the quarter-wave plate are laminated on each other to form the circularly polarizer or when two or more retardation layers are laminated to form the quarter-wave plate, the lamination is preferably performed through an adhesive layer having a refractive index as described above. Incidentally, the average refractive index $N_D^{20}$ of the adhesive layer popularly used for forming the viewing angle compensating plate or the quarter-wave plate is 1.585 in case of polycarbonate, 1.603 in case of polyallylate, 1.633 in case of polysulfone, 1.513 in case of norbornene resin, 1.650 in case of liquid-crystal polymer and 1.570 in case of polymerized liquid crystal based on the general grade.

Materials for forming the optical member are preferably laminated/integrated through an adhesive layer from the point of view of stabilization of quality due to prevention of displacement of the optical axis, and improvement of efficiency in assembling a liquid-crystal display device. The adhesive layer can be made of a suitable adhesive agent satisfying the refractive index described above and there is no particular limitation on the kind thereof. Incidentally, examples of the adhesive agent include a heat-curable adhesive agent, an energy beam-curable adhesive agent, a hot melt adhesive agent, a two-part mixed reactive adhesive agent, and a tacky adhesive agent. There is preferably used an adhesive agent excellent in transmittance with respect to light in a visible light range (380 nm to 720 nm), especially an adhesive agent having luminous transmittance of not smaller than 80%, further especially an adhesive agent having luminous transmittance of not smaller than 90%. It is further preferable from the point of view of prevention of coloring that the adhesive agent does not exhibit absorption with respect to light with a specific wavelength.

An adhesive layer exhibiting visco-elasticity even at room temperature can be preferably used from the point of view of simplicity of bonding. As a tackifier for forming the adhesive layer, there may be used a material containing, as a base polymer, a suitable polymer such as an acrylic polymer, a silicone polymer, a polyester polymer, a polyurethane polymer, a polyether polymer, or a rubber polymer. A material which needs neither a high-temperature curing process nor a high-temperature drying process and which needs neither a long-term curing process nor a long-term drying process may be preferably used in order to prevent the optical characteristic of the material from being deteriorated. In addition, a material free from the problem of separation such as floating or peeling under the condition of heating and moistening may be preferably used.

The material preferably used from the point of view is an adhesive layer having a glass transition temperature of not higher than 20° C. For example, the adhesive layer can be formed of an acrylic tackifier prepared as follows. (Meth) acrylic acid alkyl ester containing an alkyl radical having 20 or less carbon atoms, such as a methyl radical, an ethyl radical, or a butyl radical, and acrylic monomer constituted by a modifying component such as (meth)acrylic acid or hydroxyethyl (meth)acrylate are copolymerized in combination to obtain a glass transition temperature of not higher than 20° C. Thus, an acrylic polymer with a weight-average molecular weight of not smaller than 100000 is formed. The acrylic polymer is used as a base polymer to prepare the acrylic tackifier. The acrylic tackifier is also advantageous in excellent transparency, excellent weather resistance, and excellent heat resistance.

Incidentally, the acrylic polymer formed from the monomer generally has a refractive index of about 1.47. Therefore, improvement of the refractive index can be attained by a suitable method such as a method of obtaining an acrylic polymer by copolymerization of phenyl radical-containing monomers such as styrene, or a method of mixing an aromatic ring-containing tackifier resin or superfine particles of a high-refractive-index metal or metal oxide with the adhesive layer. Thus, an acrylic adhesive layer satisfying the refractive index can be formed.

Attachment of the adhesive layer to the polarizer, the viewing angle compensating plate, the quarter-wave plate or the like can be performed by use of a suitable method. Examples of the method include: a method in which about 10 to 40% by weight of a tackifier solution prepared by dissolving or dispersing tackifier components into a suitable single or mixture solvent such as toluene or ethyl acetate is directly attached onto a material by a suitable spreading method such as a casting method or a coating method; and a method in which an adhesive layer formed on a separator in the same manner as described above is transferred onto a material. The adhesive layer to be provided may be a laminate of layers different in composition or kind.

The thickness of the adhesive layer can be determined suitably in accordance with bonding force. Generally, the thickness of the adhesive layer is selected to be in a range of from 1 to 500 μm, especially in a range of from 3 to 100 μm, further especially in a range of from 5 to 50 μm. The adhesive layer may contain suitable additives such as a filler, a pigment, a colorant, and an anti-oxidant, constituted by natural or synthetic resins, glass fiber, glass beads, metal powder and other inorganic powder, and so on, as occasion demands. The adhesive layer may also contain transparent particles so that it can be formed as an adhesive layer exhibiting light-diffusing characteristic. Examples of the transparent particles include inorganic particles and organic particles. The inorganic particles are made of silica, alumina, titania, zirconia, tin oxide, indium oxide, cadmium oxide, antimony oxide, etc. and maybe electrically conductive. The organic particles are made of crosslinked or non-crosslinked polymers or the like. One member or a combination of two or more members suitably selected from the inorganic particles and the organic particles may be used as the transparent particles.

As shown in FIG. 1, an adhesive layer 4, especially an adhesive layer, may be provided on one or each of opposite outer surfaces of the optical member in accordance with necessity The thickness of the adhesive layer can be determined suitably in accordance with bonding force. Generally, the thickness of the adhesive layer is selected to be in a range of from 1 to 500 μm, especially in a range of from 3 to 100 μm, further especially in a range of from 5 to 50 μm. The adhesive layer may contain suitable additives such as filler, a pigment, a colorant, and an anti-oxidant, constituted by natural or synthetic resins, glass fiber, glass beads, metal powder and other inorganic powder, and so on, as occasion demands. The adhesive layer may also contain transparent particles so that it can be formed as an adhesive layer exhibiting light-diffusing characteristics. Examples of the transparent particles include inorganic particles and organic particles. The inorganic particles are made of silica, alumina, titania, zirconia, tin oxide, indium oxide, cadmium oxide, antimony oxide, etc. and may be electrically conductive. The organic particles are made of crosslinked or non-crosslinked polymers or the like. One member or a combination of two or more members suitably selected from the inorganic particles and the organic particles may be used as the transparent particles.

As shown in FIG. 1, an adhesive layer 4, especially an adhesive layer, may be provided on one or each of opposite outer surfaces of the optical member in accordance with necessity for the purpose of bonding the optical member to another member such as a liquid-crystal cell. It is preferable from the point of view of suppression of interfacial reflection that the refractive index $N_D^{20}$ of the adhesive layer is selected to be not lower than 1.485 in accordance with the description. In the case where the surface of the adhesive layer is exposed, the surface of the adhesive layer may be temporarily covered with a separator 5 so that the adhesive layer can be protected from contamination until the adhesive layer is put into practical use. In the case where the surface of a material forming the optical member is exposed, the exposed surface may be bonded to and covered with a surface protection film so that the material can be protected from being damaged.

The optical member can be used for various purposes in accordance with the related art. Particularly, the optical member can be preferably used for forming a liquid-crystal display device of the type in which each pixel is divided into multiple domains in orientation and displayed in a circularly polarizing mode. For example, the liquid-crystal display device can be formed by a method in which the optical member is disposed on one or each of opposite surfaces of a liquid-crystal cell. In this case, it is preferable from the point of view of suppression of interfacial reflection that the optical member is bonded to the liquid-crystal cell through an adhesive layer having a refractive index $N_D^{20}$ not lower than 1.485 in accordance with the above description.

In the description, in the case where the optical member is provided on the visual side of the liquid-crystal cell, the optical member may be provided as an optical member having an anti-glare layer, or an anti-reflection layer provided on its surface. The anti-glare layer is provided for scattering external light reflected by its surface. The anti-reflection layer is provided for suppressing surface reflection of external light. That is, the anti-glare layer and the anti-reflection layer are provided for the purpose of preventing surface-reflected light from glaring and disturbing visibility of light transmitted through the display device. Hence, both the anti-glare layer and the anti-reflection layer may be provided for attaining greater improvement of the function of preventing surface-reflected light from disturbing visibility.

The anti-glare layer or the anti-reflection layer is not particularly limited and may be formed as a suitable layer exhibiting the function. For example, the anti-glare layer maybe formed as a fine roughness structure capable of scattering and reflecting light. The anti-reflection layer can be formed by an evaporation method or a plating method such as a vacuum evaporation method, an ion plating method or a sputtering method or by a suitable coating method such as a sol-gel method. That is, the anti-reflection layer can be formed as a coherent film constituted by a multilayer coating film of inorganic oxides different in refractive index or by a coating film of a low-refractive-index material such as a fluorine compound.

Incidentally, when the liquid-crystal display device is formed using a circularly polarizer, the optical member is disposed so that circularly polarized light enters the liquid-crystal cell through the viewing angle compensating plate. Hence, in the optical member, the viewing angle compensating plate is disposed nearer to the liquid-crystal cell than the circularly polarizer. When the polarizer is a circularly polarizer constituted by a combination of a linearly polarizer and a quarter-wave plate, the optical member is provided to have a structure in which the quarter-wave plate 13 is located between the linearly polarizer 11 and the viewing angle compensating plate 3 as shown in FIG. 1.

EXAMPLE 1

Opposite surfaces of a polarizing film made of iodine-adsorbed polyvinyl alcohol were bonded to and protected by cellulose triacetate films each having a refractive index ($N_D^{20}$, which will apply hereunder) of 1.485 to thereby form a linearly polarizer (single transmittance: 43%, the degree of polarization: 99.5%). A quarter-wave plate (frontal retardation: 140 nm at light with a wavelength of 550 nm, which will apply hereunder) constituted by a uniaxially drawn film of a norbornene resin with a refractive index of 1.513 was bonded and laminated onto one surface of the linearly polarizer through an adhesive layer with a refractive index of 1.506 to thereby obtain a circularly polarizer. A viewing angle compensating plate (frontal retardation: 0 nm, thicknesswise retardation: 100 nm) constituted by a biaxially drawn film of the same norbornene resin as described above was bonded and laminated onto the quarter-wave plate side of the circularly polarizer through an adhesive layer the same as described above to thereby obtain an optical member.

Incidentally, the adhesive layer was formed as follows. An acrylic polymer with a weight-average molecular weight of about 700000 was prepared by copolymerization of 76 parts by weight of butyl acrylate and 4 parts by weight of acrylic acid. In toluene, 100 parts by weight of the acrylic polymer, 20 parts by weight of an xylene tackifier (PINE CRYSTAL KE-100, made by Arakawa Chemical Industries, Ltd.) and 0.06 parts by weight of an isocyanate crosslinking agent (coronate L, made by Nippon Polyurethane Industry Co., Ltd.) were dissolved to prepare 13% by weight of a coating solution. The coating solution was applied on a lubricated polyester film by an applicator and dried at 130° C. for 3 minutes to form an adhesive layer 20 $\mu$m thick. The adhesive layer was transferred onto a predetermined surface.

EXAMPLE 2

Four kinds of cholesteric liquid-crystal polymer layers mirror-reflecting right-handed circularly polarized light in wavelength ranges of (A) from 650 to 750 nm, (B) from 550 to 650 nm, (C) from 450 to 550 nm and (D) from 350 to 450 nm respectively were obtained by the following method. A 0.1 $\mu$m-thick polyvinyl alcohol layer was provided on a 50 $\mu$m-thick cellulose triacetate film (refractive index: 1.485) exhibiting no birefringence and rubbed with rayon cloth to thereby form an oriented film. On the oriented film, 20% by weight of a tetrahydrofuran solution of an acrylic thermotropic cholesteric liquid-crystal polymer was applied by a wire bar and dried. Then, the solution was heated at 150° C. for 5 minutes so as to be oriented and then left at room temperature so as to be cooled. Thus, a 1.5 m-thick cholesteric liquid-crystal polymer layer oriented in Grandjean texture was formed.

Then, the cholesteric liquid-crystal polymer layers (A) and (B) were thermal-compression bonded to each other at 150±2° C. for 2 minutes while the liquid-crystal surfaces of the two layers came into close contact with each other. Then, the cellulose triacetate film on the liquid-crystal layer (B) side was peeled off. To the exposed surface of the liquid-crystal polymer layer (B) in the combined layer, the cholesteric liquid-crystal polymer layer (C) were thermal-compression bonded at 150±2° C. for 2 minutes while the liquid-crystal surfaces of the two layers came into close contact with each other. Then, the combined layer and the cholesteric liquid-crystal polymer layer (D) were thermal-compression bonded to each other in the same manner as described above. Thus, a circularly polarizer having a cholesteric liquid-crystal layer with a helical pitch changed in the direction of the thickness thereof and exhibiting circular dichroism in a wavelength range of from 400 to 700 nm was obtained. The average refractive index of the liquid-crystal polymer used was 1.575. Then, the circularly polarizer and a viewing angle compensating plate were bonded and laminated onto each other through an adhesive layer in the same manner as in Example 1. Thus, an optical member was obtained. Incidentally, the adhesive layer was provided as a layer having a refractive index of 1.532 by use of 40 parts by weight of the xylene tackifier.

Comparative Example 1

An optical member was obtained in the same manner as in Example 1 except that the linearly polarizer and the quarter-wave plate were bonded and laminated onto each other through an adhesive layer having a refractive index of 1.467 without addition of the tackifier.

Comparative Example 2

An optical member was obtained in the same manner as in Example 1 except that the linearly polarizer and the quarter-wave plate were bonded and laminated onto each other through an adhesive layer having a refractive index of 1.467 without addition of the tackifier and except that the quarter-wave plate and the viewing angle compensating plate were bonded and laminated onto each other through an adhesive layer having a refractive index of 1.467 without addition of the tackifier.

Comparative Example 3

An optical member was obtained in the same manner as in Example 2 except that the cholesteric liquid-crystal circularly polarizer and the viewing angle compensating plate were bonded and laminated onto each other through an adhesive layer having a refractive index of 1.467 without addition of the tackifier.

Evaluation Test

The optical member obtained in each of Examples 1 and 2 and Comparative Examples 1 to 3 was substituted for a polarizer in each of backlight and visual sides of a multi-domain type VA liquid-crystal display panel available on the market. The optical member was bonded to each of the opposite sides of the display panel through the adhesive layer used in Example 1 to thereby form a liquid-crystal display device. The brightness and contrast of the liquid-crystal display device were evaluated by eye observation.

As a result of the evaluation, the order of brightness was

Example 2>Comparative Example 3>Example 1>Comparative Example 1>Comparative Example 2, and the order of contrast was Example 1>Comparative Example 1>Comparative Example 2>Example 2>Comparative Example 3.

In the contrast evaluation, the contrast of the panel using the cholesteric liquid-crystal circularly polarizer was low because use of circularly polarized light in the cholesteric liquid-crystal layer was not sufficient. However, when circularly polarized light reflected was recycled to the backlight side, the display was made extremely bright so that visibility was improved.

It was apparent from comparison of Examples with Comparative Examples that contrast was kept high when each lamination was performed through an adhesive layer having a moderate refractive index. Further, slight improvement of brightness based on reduction of light loss due to interfacial reflection was found. With respect to contrast, this tendency was remarkable when viewing was made at a shallower angle.

What is claimed is:

1. An optical member comprising:
   a circular polarizer made of a laminate of a linear polarizer and a quarter-wave plate;
   a viewing angle compensating plate; and
   an adhesive layer which has a refractive index $N_D^{20}$ not lower than 1.485 but lower than those of the viewing angle compensating plate and the quarter-wave plate, and through which said polarizer and said viewing angle compensating plate are laminated on each other, said adhesive layer exhibiting visco-elasticity at room temperature.

2. An optical member according to claim 1, wherein said linear polarizer and said quarter-wave plate constituting said circular polarizer are laminated on each other through an additional adhesive layer having a refractive index $N_D^{20}$ not lower than 1.485.

3. An optical member according to claim 1, wherein said viewing angle compensating plate has a frontal retardation of not larger than 100 nm and a thicknesswise retardation of not lower than 50 nm on the basis of light with a wavelength of 550 nm.

4. An optical member according to claim 1, further comprising at least one additional adhesive layer disposed on at least one of opposite outer surfaces and having a refractive index $N_D^{20}$ not lower than 1.485.

5. An optical member according to claim 1, wherein said adhesive layer is constituted by an adhesive layer having a glass transition temperature of not higher than 20° C.

6. A liquid-crystal display device comprising:
   at least one optical member defined in claim 1;
   a liquid-crystal cell; and
   an adhesive layer which has a refractive index $N_D^{20}$ not lower than 1.485 and through which said optical member is bonded onto at least one of opposite surfaces of said liquid-crystal cell.

7. An optical member according to claim 1, wherein said circular polarizer is made of a cholesteric liquid-crystal layer oriented in Grandjean texture.

8. An optical member according to claim 1, wherein said refractive index is not lower than 1.532.

9. An optical member according to claim 1, wherein the adhesive layer is a laminate of layers having different compositions or kinds.

* * * * *